United States Patent
Brush et al.

(10) Patent No.: US 9,898,971 B1
(45) Date of Patent: Feb. 20, 2018

(54) SYSTEM, METHOD, AND APPARATUS TO SELECTIVELY CONTROL BRIGHTNESS OF LIQUID CRYSTAL DISPLAY

(71) Applicant: Caterpillar Inc., Peoria, IL (US)

(72) Inventors: Jeffrey A. Brush, Dunlap, IL (US); Daniel J. Leach, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 3 days.

(21) Appl. No.: 15/233,603

(22) Filed: Aug. 10, 2016

(51) Int. Cl.
  *G09G 3/34* (2006.01)
  *G09G 3/36* (2006.01)
  *B60K 35/00* (2006.01)
  *G08B 21/18* (2006.01)

(52) U.S. Cl.
  CPC .......... *G09G 3/3406* (2013.01); *B60K 35/00* (2013.01); *G08B 21/187* (2013.01); *G09G 3/36* (2013.01); *B60K 2350/2069* (2013.01); *B60K 2350/352* (2013.01); *G09G 2320/0626* (2013.01); *G09G 2320/08* (2013.01); *G09G 2354/00* (2013.01); *G09G 2380/10* (2013.01)

(58) Field of Classification Search
  CPC .............. G09G 3/3406; G09G 3/36; G09G 2320/0626; G09G 2320/08; G09G 2354/00; G09G 2380/10; G08B 21/187; B60K 35/00; B60K 2350/2069
  See application file for complete search history.

(56) References Cited

U.S. PATENT DOCUMENTS

| | | | |
|---|---|---|---|
| 8,368,823 B2 * | 2/2013 | Watanabe | G01C 21/36 348/837 |
| 9,013,525 B2 | 4/2015 | Saier et al. | |
| 9,378,688 B2 | 6/2016 | Brush | |
| 2006/0232986 A1 * | 10/2006 | Miyagaki | B60K 37/02 362/459 |
| 2011/0050738 A1 * | 3/2011 | Fujioka | G09G 3/36 345/690 |
| 2011/0175902 A1 * | 7/2011 | Mahowald | H04N 13/0495 345/419 |
| 2015/0279260 A1 * | 10/2015 | Katagiri | B60K 35/00 345/590 |

FOREIGN PATENT DOCUMENTS

JP  2014-130278  7/2014

* cited by examiner

*Primary Examiner* — Ryan A Lubit
(74) *Attorney, Agent, or Firm* — James S. Bennin

(57) ABSTRACT

The disclosure relates to a system, a method, and an apparatus to selectively control brightness of information displayed on a Liquid Crystal Display (LCD). A graphics layer can be provided in a display area of the LCD, and a semi-transparent mask layer can be provided above the graphics layer. An information graphics layer can be provided above the semi-transparent mask layer. The information graphics layer can be controlled to selectively display predetermined information on the LCD at an intended brightness, while remaining information from the underlying graphics layer can be dimmed relative to the brightness of the display predetermined information by activation of the semi-transparent mask layer.

20 Claims, 5 Drawing Sheets

SYSTEM, METHOD, AND APPARATUS TO SELECTIVELY CONTROL BRIGHTNESS OF LIQUID CRYSTAL DISPLAY

TECHNICAL FIELD

The present disclosure relates to a Liquid Crystal Display (LCD), and more particularly, to controlling individual brightness of select information items displayed on the LCD.

BACKGROUND

Machines, such as on-road vehicles and off-road vehicles, can include a display to display or indicate various operating conditions or parameters of the machines, so that an operator may take necessary action or simply be informed based on the displayed operating condition information. Drawing operator attention to a specific portion of the display can be important to quickly and effectively communicate important information to the operator, such as high priority or urgent information (e.g., a persistent condition, a warning, or an alert). In this regard, display of such important information within the display can require display at brightness levels higher than a brightness level or levels of other graphics displayed on the display.

U.S. Pat. No. 9,378,688 (hereinafter the '688 patent) describes a control system and method for controlling brightness in areas of an LCD. According to the '688 patent, the LCD includes a first display area and a second display area. A controller, in communication with the LCD, can be configured to display an icon at an icon brightness level in the first display area and a first image in the second display area. The controller can be configured to further apply a mask image over the second display area. As such, the first image is visible through the mask image at a first composite brightness level that is less than the icon brightness level.

SUMMARY OF THE DISCLOSURE

In one aspect of the present disclosure, a vehicle is provided. The vehicle includes one or more sensors each configured to detect one or more operating conditions of the vehicle, and a Liquid Crystal Display (LCD) provided in an operator area of the vehicle. The LCD has a display area and is configured to selectively display a graphics layer in the display area, a dimming mask layer over the graphics layer, and an alert layer over the dimming mask layer. The alert layer includes one or more alerts to alert an operator of the vehicle regarding the one or more operating conditions of the vehicle detected by the one or more sensors. The vehicle further includes control circuitry in communication with the LCD and the one or more sensors. The control circuitry is configured to: determine an abnormal operating condition of the vehicle based on data from the one or more sensors corresponding to the one or more operating conditions of the vehicle. The control circuitry is also configured to activate, simultaneously and responsive to the determined abnormal operating condition of the vehicle, the alert layer to display the one or more alerts, the dimming mask layer, and brightness reduction of the graphics layer. The alert layer, the dimming mask layer, and the brightness reduction are simultaneously activated such that a brightness level of the one or more alerts is greater than a brightness level of the graphics layer by at least a predetermined brightness amount. The dimming mask layer covers the graphics layer entirely in a front view of the LCD and is free of any cut-out portions that preclude dimming of the dimming mask layer in the areas defined by the cut-out portions.

In another aspect of the present disclosure, a control system is provided. The control system includes a Liquid Crystal Display (LCD) and a controller in communication with the LCD. The controller is configured to control display of a graphics layer in a display area of the LCD. The controller is further configured to control display of a transparency-controllable mask layer over the graphics layer such that a transparency amount provided by the mask layer covers the display area of the LCD. The controller is also configured to control display of at least one indication of an information layer over the mask layer. The information layer has a plurality of indications, the plurality of indications including the displayed at least one indication, and the plurality of indications are individually displayable as part of the information layer. A brightness level of any indications of the information layer is greater than a brightness level of any portion of the graphics layer displayed in the display area of the LCD.

In yet another aspect of the present disclosure, a method to selectively control brightness of a Liquid Crystal Display (LCD) is provided. The method includes providing a graphics layer in a display area of the LCD, providing a semi-transparent masking layer above the graphics layer, and providing an indication layer above the semi-transparent mask layer. The indication layer is controllable independent of the graphics layer and the semi-transparent mask layer to selectively display at least one graphical indication such that the at least one graphical indication, when displayed, always has a brightness greater than a brightness of any graphics of the graphics layer displayed when the at least one graphical indication is displayed.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
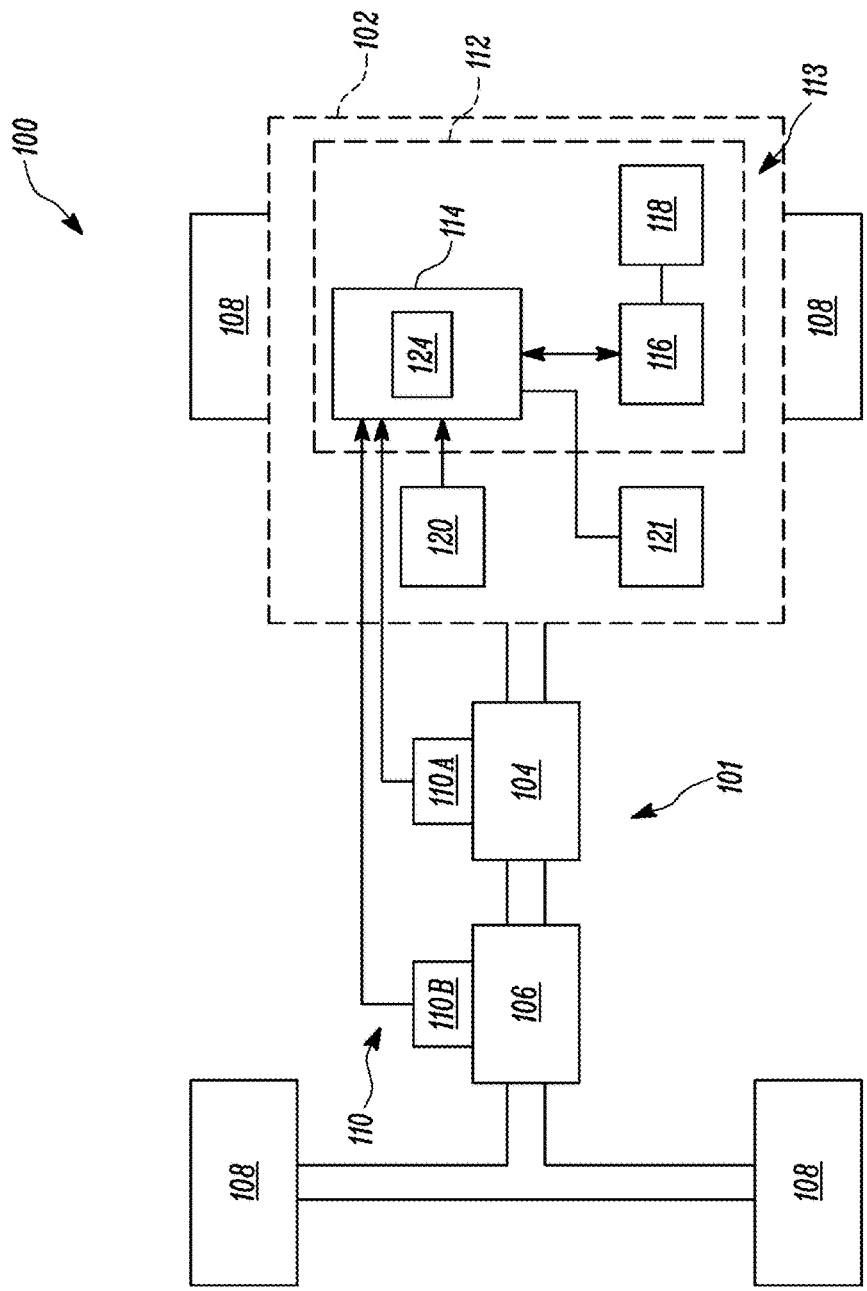
FIG. 1 is a schematic block diagram of a vehicle according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter can separate predetermined important information, such as high priority information or urgent information (e.g., a persistent condition, a warning, or an alert) from an underlying semi-transparent mask and underlying graphics of a graphics layer below the semi-transparent mask by displaying the important information on a Liquid Crystal Display (LCD) brighter than the graphics of the graphics layer displayed on the LCD. The brighter important information can be selectively displayed by selective activation of an additional graphics layer above the semi-transparent mask. Thus, the important information of the additional graphics layer can be displayed at an intended brightness level, while allowing remaining information displayed on the LCD by the graphics layer to be displayed at a brightness level below the intended brightness level of the important information. Further, the semi-transparent mask can cover the whole display area of the LCD and may be free of any cut-out portions, such as holes or openings, that may preclude changing transparency of the semi-transparent mask in areas defined by the cut-out portions to modify brightness (e.g., dim) of corresponding portions of the graphics layer underlying the cut-out portions.

FIG. 1 illustrates a schematic block diagram of a vehicle 100 according to one or more embodiments of the present disclosure. Of course, though FIG. 1 illustrates vehicle 100, embodiments of the disclosed subject matter are not limited to vehicles and can be implemented in other forms of machinery, including stationary machines. Non-limiting examples of stationary machines according to embodiments of the disclosed subject matter can include a generator set and a stationary crane, for instance.

The vehicle 100 according to one or more embodiments may include a powertrain 101 and an operator cabin 102 mounted on a frame of the vehicle 100. The powertrain 101 may include a power source 104 to provide energy in various forms (e.g., power) to perform operations of the vehicle 100. The power source 104 may be, but is not limited to, an internal combustion engine and a hybrid engine. The powertrain 101 may further include a transmission 106 to transmit mechanical power from the power source 104 to a set of ground engaging members 108. In one or more embodiments, the transmission 106 may be or include a gear box having multiple gear drives to change a gear ratio. The gear box may be operably coupled to the set of ground engaging members 108. In another embodiment, the transmission 106 may include a generator to derive electric power from the mechanical power generated by the power source 104. In such a case, each ground engaging member of the set of ground engaging members 108 may be coupled to an electric motor such that the electric motor receives the electrical power from the generator to drive the set of ground engaging members 108.

The vehicle 100 may further include one or more sensors 110. In an embodiment, each of the components of the vehicle 100, such as the power source 104, the transmission 106, and the set of ground engaging members 108 of the vehicle 100, can be connected to one or more sensors 110 to detect an operating condition or characteristic of the vehicle 100. In another embodiment, multiple sensors 110 may be coupled to each of the power source 104, the transmission 106, and the set of ground engaging members 108 to detect operating conditions or characteristics of the vehicle 100. In one or more embodiments, the sensors 110 may be, but are not limited to, a fluid or charge level sensor, a temperature sensor, a Global Position System (GPS) sensor, a pressure sensor, a torque sensor, and a tire-pressure monitoring sensor.

In one or more embodiments, the operating condition of the vehicle 100 may correspond to, but is not limited to, a fuel level in a fuel tank, a coolant temperature, an engine temperature, vehicle speed, and a battery charge level. In one example, operating conditions of the vehicle 100 can be associated with the power source 104 and may include, but are not limited to, speed of the engine and aftertreatment parameters, such as temperature of Diesel Exhaust Fluid (DEF), pressure of DEF, and a level of DEF in a DEF storage tank. In another example, operating conditions may be associated with the transmission 106 and may include, but are not limited to, a gear ratio of the transmission 106, transmission torque, a transmission fluid level, and a transmission fluid temperature. In yet another example, operating conditions associated with the vehicle 100 can be related to the set of ground engaging members, such as tire pressure in the case of tires being the ground engaging members.

In the non-limiting illustrated in FIG. 1, a first sensor 110A may be coupled to the power source 104 of the vehicle 100 to detect one or more operating conditions of the power source 104. The first sensor 110A may be in communication with a control system 112 of the vehicle 100. The first sensor 110A may be configured to transmit data representative of the detected one or more operating conditions of the power source 104 to the control system 112. A second sensor 110B may also be provided, and can be coupled to the transmission 106 of the vehicle 100, for instance, to detect one or more operating conditions of the transmission 106. The second sensor 110B may be in communication with the control system 112 of the vehicle 100. The second sensor 110B may be configured to transmit data representative of the one or more operating conditions of the transmission 106.

In one or more embodiments, the control system 112, or a portion thereof, may be disposed in the operator cabin 102 of the vehicle 100. In one or more embodiments, the control system 112 may be provided in an operator area 113 provided in the operator cabin 102 of the vehicle 100. The operator area 113 may be referred to as an operator console having control inputs (e.g., levers, switches, a touch screen, etc.) within the operator cabin 102 to control operation of the vehicle 100. The operator area 113 may be further defined as an area surrounding an operator seat within the operator cabin 102. In one or more embodiments, the control system 112 may be provided in a suitable location visually accessible by an operator of the vehicle 100. Further, in one or more embodiments, components of the control system 112 may be disposed at a location remote from the vehicle 100, and can receive data from the sensors 110 and/or a controller 114 of the vehicle 100 using wireless communication components of the vehicle 100. In such a case, an operator located remotely from the vehicle 100 may control some or all functions of the control system 112 from the remote location. Further, the control system 112 may include the controller 114, which may be embodied in or as circuitry, and a Liquid Control Display (LCD) 116 communicably coupled to the controller 114 such that the controller 114 can control information displayed on the LCD 116, particularly individual brightness control of different graphics displayed on the LCD.

The controller 114 may be configured to receive data from each of the sensors 110 (e.g., first sensor 110A and the second sensor 110B) regarding corresponding operating conditions of the vehicle 100, such as operating conditions of the power source 104 and the transmission 106 (and/or other components of the vehicle 100). The controller 114 may include input circuitry 124, and the input circuitry 124 may be communicably coupled to the sensors 110 to receive data from the sensors 110 regarding sensed operating conditions or characteristics of the vehicle 100. Thus, the controller 114 can determine one or more abnormal operation conditions of the vehicle 100 based on data received from the sensors 110. The controller 114 may also communicate (i.e., send signals for control and display) with the LCD 116 to control content displayed on the LCD 116 and how the content is displayed (e.g., individual brightness of graphics displayed on the LCD 116).

In an embodiment, the LCD 116 may be disposed in the operator area 113 of the vehicle 100. For example, the LCD 116 may be disposed at a location visually accessible to the operator of the vehicle 100. Further, the LCD 116 may be configured to display to the operator data or information pertaining to one or more determined operating conditions or characteristics of the vehicle 100 or conditions surrounding the vehicle 100, such as ambient light. The operating conditions or characteristics of the vehicle 100 may be displayed on the LCD 116 via graphics embodied in the LCD 116, which may be provided based on different graphics layers as discussed in more detail below.

The control system 112 can also include a user interface 118 communicably connected to the controller 114. In an embodiment, the user interface 118 may be a separate component disposed in the operator area 113 within the operator cabin 102. In another embodiment, the LCD 116 may be integrally formed with the user interface 118. That is, the LCD 116 may be configured to receive an input from the operator of the vehicle 100. The user interface 118 may be configured to enable the operator to interact with the controller 114 of the control system 112 to control the vehicle 100 or systems or components thereof, such as settings for the LCD 116 or information displayed on the LCD 116. In one or more embodiments, the user interface 118 may be a touch screen, and may be an integral part of the LCD 116. Additionally or alternatively, in one or more embodiments, the user interface 118 may be or include a mouse, a pointer, and/or a keyboard. In some implementations, and as explained above, the sensor 110 may be configured to transmit, to the controller 114, data representative of operating conditions of other components of the vehicle 100.

The control system 112 may further include a light sensor 120 and a speaker 121 disposed in the operator area 113 within the operator cabin 102 of the vehicle 100. The light sensor 120 may be communicably connected to the controller 114. Generally speaking, the light sensor 120 can detect a brightness level of an ambient light, for instance, within the operator cabin 102. The light sensor 120 may further transmit a signal indicative of the brightness level of the ambient light to the control system 112. In one or more embodiments, the light sensor 120 may be disposed at any location in the vehicle 100 to communicate data indicative of the brightness level of the ambient light. Further, the light sensor 120 may be disposed in proximity to the LCD 116, to detect a brightness level associated with a space around the LCD 116. The speaker 121 may be communicably connected to the control circuitry 114. In one or more embodiments, the speaker 121 may be disposed at any location in the vehicle 100 to provide an audio signal to the operator, for instance.

Figure 2:
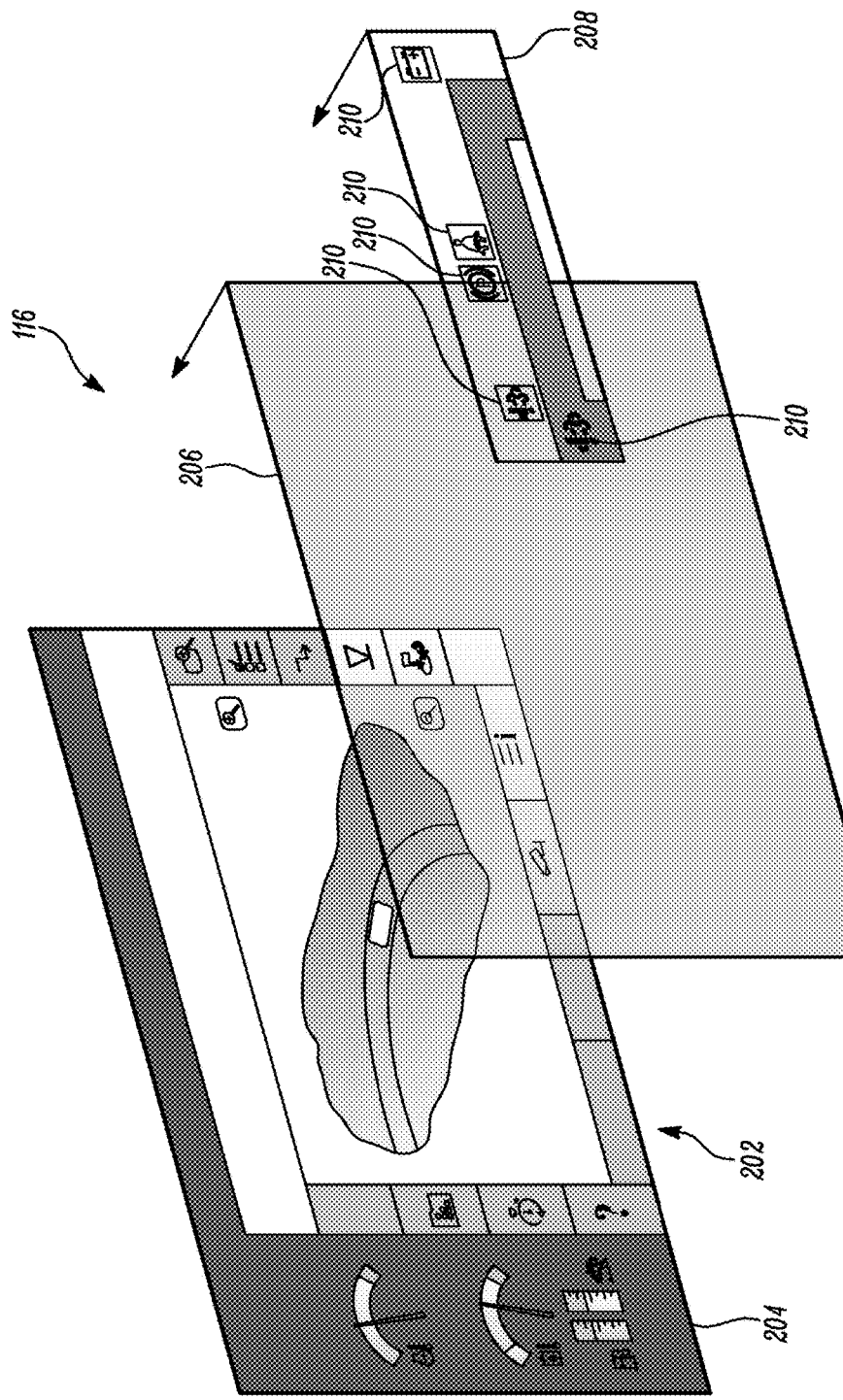
FIG. 2 is a schematic exploded representation of a portion of a Liquid Crystal Display (LCD) according to one or more embodiments of the present disclosure.

FIG. 2 illustrates a schematic exploded view of a portion of the LCD 116 according to one or more embodiments of the present disclosure. The LCD 116 can define a display area 202. Further, the LCD 116 can have a graphics layer 204, a dimming mask layer 206, and an information layer 208. The dimming mask layer 206 may consist of a single dimming mask, though in one or more embodiments of the disclosed subject matter the transparency of the single dimming mask layer may be varied such that the single dimming mask can effectively operate as a plurality of different dimming mask layers, each having different transparencies, and operable on an individual basis depending upon the amount of dimming to be applied to the underlying graphics layer 204. The information layer 208 can be over the dimming mask layer 206, which can be over the graphics layer 204.

Generally speaking, information displayable by the information layer 208 may be important information having a higher priority or urgency as compared to the information displayable by the graphics layer 204. Thus, the information layer 208 may be referred to herein as an alert layer in a case where the information layer 208 includes alert or warning information to display on the LCD 116.

Graphics indicative of the various operating conditions of the vehicle 100 may be displayed in the LCD 116 at different brightness levels, depending upon whether such information is displayable by the graphics layer 204 or the information layer 208. In this regard, generally speaking, the controller 114 of the control system 112 can control a brightness level of the graphics layer 204, a transparency amount of the dimming mask layer 206, and a brightness level of the information layer 208.

The graphics layer 204 may be provided on the display area 202 of the LCD 116, and may cover some or all of the display area 202. Graphics, such as graphics pertaining to operating conditions of the vehicle 100, may be embodied on the graphics layer 204 of the LCD 116. In one or more embodiments, the graphics of the graphics layer 204 may provide vehicle-related information, such as information regarding operating conditions or characteristics of the vehicle 100. Other information may be provided by the graphics layer, such as ambient temperature information surrounding the vehicle, date information, time information, map information, terrain information, battery level, fuel level, engine temperature, lubricant level, a camera feed, a video input, etc.

As noted above, the dimming mask layer 206 may be provided over the graphics layer 204. The dimming mask layer 206 may have a same area as the display area 202 of the LCD 116. Thus, the dimming mask layer may cover the display area 202 completely. Further, the dimming mask layer 206 can be free of any cut-out portions, such as openings, holes or tabs, including any such portions at edges of the dimming mask layer 206. Thus, the dimming mask layer 206 may also cover the entire area of the graphics layer 204 and the display area 202 of the LCD 116. Any use of the term "dimming mask layer" herein may also refer to a "semi-transparent mask layer."

The dimming mask layer 206 may be a semi-transparent layer (e.g., an electronically generated layer generated using software, for instance) provided over the graphics layer 204. Generally speaking, the dimming mask layer 206 can control the brightness (or "dimness") of the graphics layer 204 based on a transparency value of the dimming mask layer 206. In one or more embodiments, the dimming mask layer 206 may be controllable by the controller 114 to change a transparency value, level or percent of the dimming mask layer 206. More specifically, the transparency of the dimming mask layer 206 may be changed to selectively vary and/or set the brightness of displayed graphics of the graphics layer 204.

In addition, in one or more embodiments, the brightness of the graphics of the graphics layer 204 of the LCD 116 may be modified, for instance reduced, via backlighting control of the LCD 116, which may be controlled by the controller 114. For example, in one or more embodiments, the brightness of the graphics embodied on the graphics layer 204 may be adjusted based on the level of the ambient light within the operator cabin 102 of the vehicle 100, as detected by the light sensor 120, for instance. The operator of the vehicle 100 may also manually adjust the brightness level of the graphics of the graphics layer 204.

As noted above, the information layer 208 can be provided above or over the dimming mask layer 206. In one or more embodiments, the information layer 208 may be a single layer (e.g., a graphics layer generated using software, for instance) provided above or over the dimming mask layer 206. The information layer 208 may be controlled by the controller 114 to display one or more indication or information items 210 to be more readily noticed or understood by the operator of the vehicle 100. For example, the one or more information items 210 may be warnings or alerts to the operator of the vehicle 100 generated based on a detected operating condition or characteristic of the vehicle 100. The term "information items 210" as used herein may interchangeably be referred to as "indications." In one or more embodiments, the graphics associated with the information items 210 may include, but are not limited to, one or more alerts or warnings indicative of operating characteristics surrounding the power source 104, a coolant temperature, a battery, the transmission 106, a transmission temperature, a service reminder, a Diesel Exhaust Particulate Filter (DPF), and/or a Diesel Exhaust Fluid (DEF) level.

In one or more embodiments, the dimming mask layer 206 may be controllable independent of the information layer 208. Further, the dimming mask layer 206 and the information layer 208 may be controllable independent of the graphics layer 204 of the LCD 116. Of course, the information layer 208, the dimming mask layer 206, and the graphics layer 204 may be activated simultaneously or at the same time, meaning, for instance, that all three layers contribute to display characteristics of the display area 202 of the LCD 116.

Figure 3:
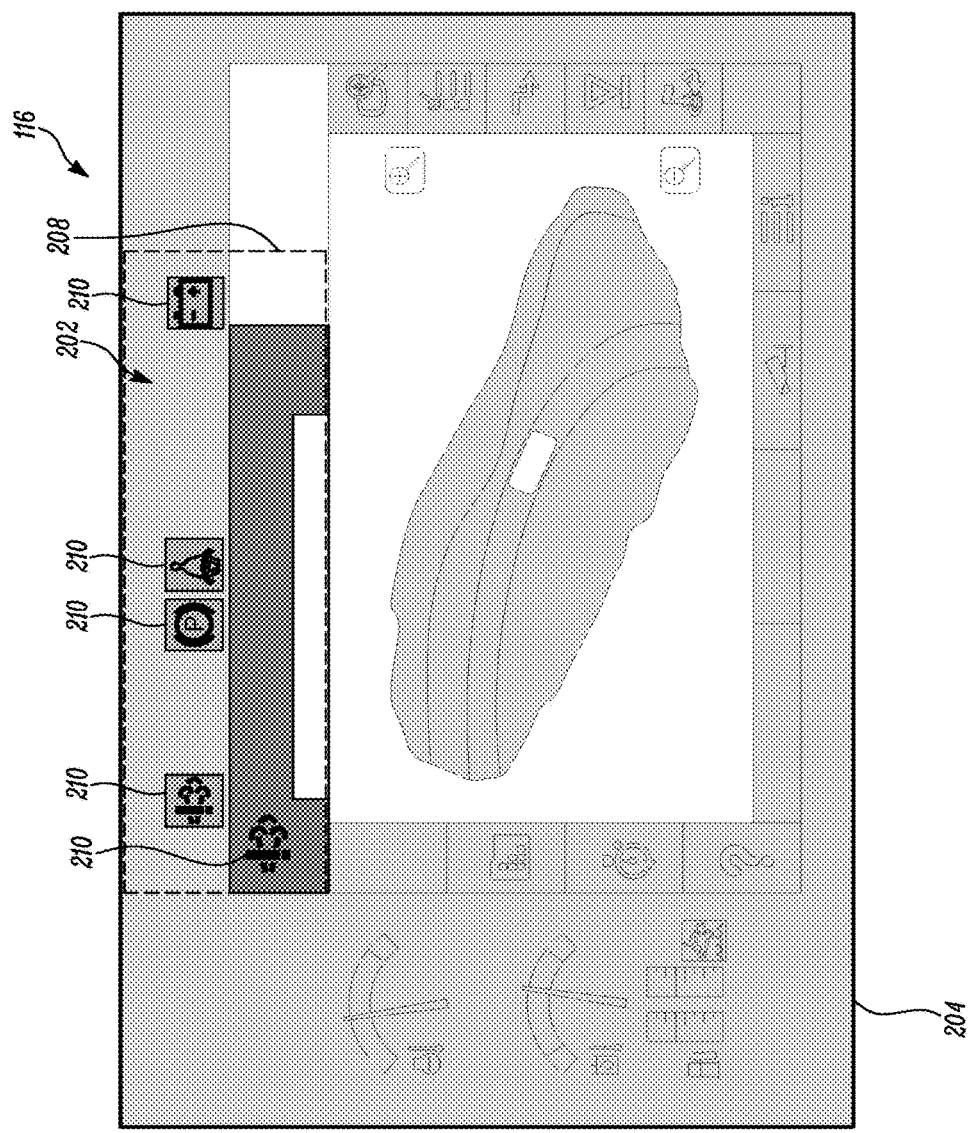
FIG. 3 is a schematic front view of a portion of the LCD of FIG. 2, according to one or more embodiments of the present disclosure.

FIG. 3 illustrates a schematic front view of a portion of the LCD 116 according to one or more embodiments of the present disclosure. As mentioned earlier, each of the one or more sensors 110 may detect a corresponding operating condition of the vehicle 100. Further, the sensors 110 may communicate data indicative of the operating condition of the vehicle 100 to a controller 114 (which may be embodied in or as control circuitry). The input circuitry 124 of the controller 114 may receive the data indicative of the operating condition or conditions of the vehicle 100 from the one or more sensors 110. The controller 114 may receive an input to adjust (e.g., dim) the brightness of the LCD 116. The input to adjust the brightness of the LCD 116 may be generated based on detection of an operating condition of the vehicle 100 or a condition associated with operation of the vehicle, such as an ambient light level in an area of viewing the LCD 116. Additionally or alternatively, the input to adjust the brightness of the LCD 116 may be based on operator adjustment of the brightness of the LCD 116 using the user interface 118, for instance. Thus, the input to adjust the brightness of the LCD 116 may include an instruction that corresponds to reducing the brightness level of the LCD 116 and/or increasing the brightness level of the LCD 116. The controller 114 may also determine one or more abnormal operation conditions of the vehicle 100 based on data from the one or more sensors 110.

The controller 114 can control display graphics of the graphics layer 204 in the display area 202 of the LCD 116 based on the data indicative of the detected operating conditions of the vehicle 100. The controller 114 can also control display of graphics of the graphics layer 204 not expressly based on the detected operating conditions of the vehicle 100, such as template operating condition information that may not change based on changing operating conditions of the vehicle 100.

The controller 114 may further activate the dimming mask layer 206, for instance, from a fully transparent state. Activation of the dimming mask layer 206 can cause the dimming mask layer 206 to be "displayed" over the graphics layer 204, i.e., the tint or opacity of dimming mask layer 204 can be noticed by a viewer of the LCD 116 at least based on the effect of dimming the underlying graphics layer 204. Further, as noted above, the dimming mask layer 206 may completely cover or completely overlap the display area 202 (and the graphics layer 204) in a front view of the LCD 116, such as illustrated in FIG. 3.

The controller 114 may further activate the information layer 208 to control display of at least one indication or information item 210 of the information layer 208 on the LCD 116, over the dimming mask layer 206 and the graphics layer 204, for instance, based on a detected or determined abnormal operation condition of the vehicle 100 and/or an input to dim the LCD. The information layer 208 may include a plurality of information items 210, though not all of the information items 210 may be displayed at once. That is, one or more of the information items 210 may be displayed based on one or more criteria, such as responsive to a particular detected or determined operating condition of the vehicle 100 and/or an input to dim the LCD. Of course, in one or more embodiments of the disclosed subject matter, all information items 210 associated with the information layer 208 may be displayed at once. The input to dim the LCD 116 (and activate the information layer 208) may be generated based on detection of an abnormal operation condition of the vehicle 100. Thus, the input to dim the LCD 116 may be a control signal from the controller 114 generated in responsive to detection of the abnormal operation condition of vehicle 100. In some embodiments, the input to dim the LCD may be a manual input by the operator to a control panel configured to control the LCD 116. In one or more embodiments, the at least one information item 210 may include one or more alerts.

The controller 114 may cause or control display of at least one information item 210 of the information layer 208 over the dimming mask layer 206 (and the graphics layer 204). In one or more embodiments, the information layer 208 may have a plurality of information items 210 that are individually or collectively displayable as part of the information layer 208. Further, though FIG. 2 and FIG. 3 show the information layer 208 being comprised of a single area, of a particular shape and graphics configuration, one or more embodiments of the disclosed subject matter can have an information layer 208 with different and distinct information areas with differing graphics forming at least one information item 210.

The display of the at least one information item 210 by the information layer 208 may not cause a change of display of the graphics displayed on the graphics layer 204 of the LCD 116. A total area of the at least one indication or information item 210 of the alert layer 208 may be a portion of the display area 202 of the LCD 116. For example, the total area of the indication or information item 210 of the alert layer 208 may be at least one of from approximately 5% to approximately 25% of the display area 202 of the LCD 116, from approximately 10% to approximately 25% of the display area 202 of the LCD 116, from approximately 15% to approximately 25% of the display area 202 of the LCD 116, and from approximately 20% to approximately 25% of the display area 202 of the LCD 116. Further, the at least one indication or information item 210 may overlap or be over a graphic of the graphics layer 204, for instance, to emphasize the indication or information item 210 relative to the underlying graphic.

Upon activation of the information layer 208, the controller 114 may increase the brightness level of the information layer 208, which may mean merely making one or more information items 210 of the information layer 208 appear in a case where such information items 210 were not previously visible. Simultaneously, the controller 114 may decrease the transparency level of the dimming mask layer 206 to make the dimming mask layer 206 less transparent. Optionally, the transparency level of the dimming mask layer 206 can be decreased from fully transparent (i.e., 100% transparency) to a transparency value less than 100%. As such, the brightness level of any information items 210 of the information layer 208 may be greater than the brightness level of any portion of the graphics layer 204, for example, by at least a predetermined brightness amount. In one or more embodiments, the brightness level of graphics of the information layer 208 may always be brighter than any graphics of the underlying graphics layer 204.

In one or more embodiments, the predetermined brightness amount may be determined based on the level of the ambient light within the operator cabin 102 of the vehicle 100 detected by the light sensor 120, for instance. Additionally or alternatively, the predetermined brightness amount may be determined based on severity of determined abnormal operation condition of the vehicle 100. In one or more embodiments, the predetermined brightness amount may be determined based on factors including, but not limited to, surrounding factors of the vehicle 100 such as visibility of the operator within and outside the operator cabin 102. It may be contemplated that the controller 114 may cause display of the dimming mask layer 206 at a same time when the information layer 208 displays any of the indication or information items 210.

Further, the controller 114 may activate the information layer 208 to display information in the form of a warning or an alert in the display area 202 of the LCD 116 to emphasize one or more of the indication or information item 210 of the information layer 208, as shown in FIG. 3, for instance. Thus, generally speaking, any information items 210 displayed upon activation of the information layer 208 may be brighter than any displayed graphics of the underlying graphics layer 104.

Of course, activation of the information layer 208 may cause display of less than all of information items 210 available to display by the information layer 208. For example, activation of the information layer 208 can activate only information items 210 that pertain to a sensed or determined operating condition of the vehicle 100. Optionally, another one or more information items 210 pertaining to another sensed operation condition of the vehicle 100 may be displayed with the already displayed information items 210. Alternatively, the already displayed information items 210 pertaining to the prior sensed or determined operating condition of the vehicle 100 may be deactivated (i.e., no longer displayed) such that only another one or more information items 210 pertaining to the another sensed operation condition of the vehicle 100 are displayed by the information layer 208.

The activation of the information layer 208 to display information may not cause a change of any graphics of the graphics layer 204. As noted above, the controller 114 may, simultaneously or at the same time, activate the dimming mask layer 206 and brightness reduction of the graphics layer 204 of the LCD 116 based on backlighting control of the LCD 116. Optionally, brightness of displayed information items 210 and the graphics of the graphics layer 204 can be decreased after the initial activation of the information layer 208, though the brightness of the displayed information items 210 of the information layer 208 may always be brighter than the graphics of the graphics layer 204, for instance, by a predetermined amount of brightness (i.e., a brightness ratio). For example, brightness of displayed information items 210 of the information layer 208 and the graphics of the graphics layer 204 can be decreased in response to an input by the operator at user interface 118 to reduce the overall brightness of the LCD 116. However, the brightness of the displayed information items 210 can remain brighter than the displayed graphics of the graphics layer 204.

Figure 4:
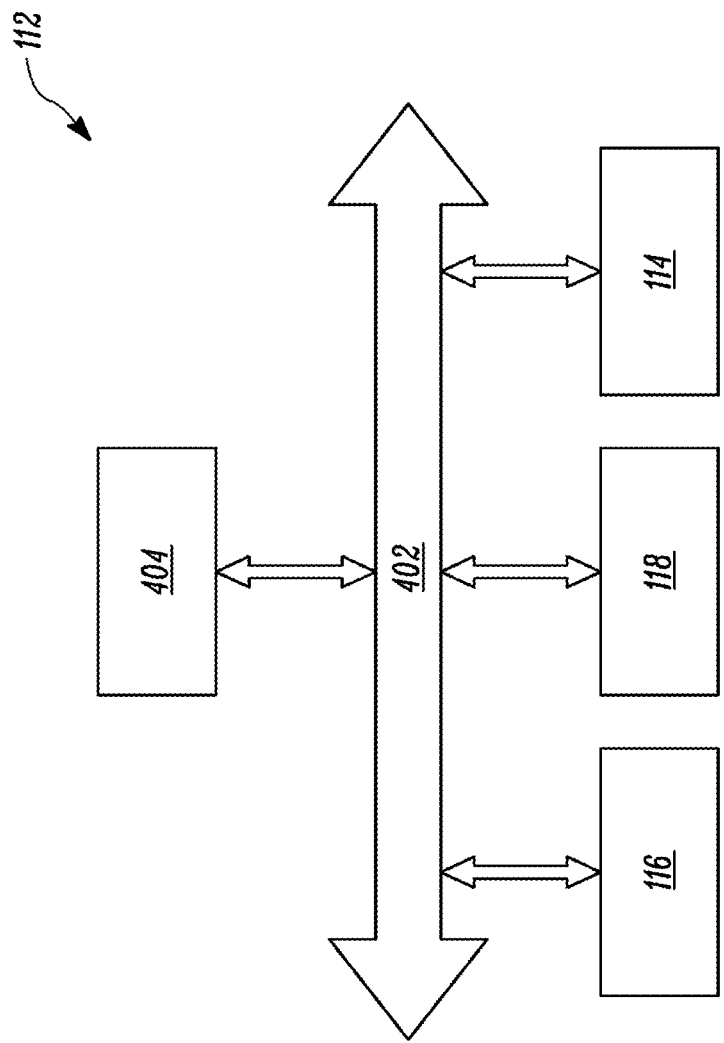
FIG. 4 is a block diagram of a control system to control individual brightness of select graphics displayed on the LCD according to one or more embodiments of the present disclosure.

FIG. 4 illustrates a block diagram of a control system, such as control system 112, for controlling individual brightness of select graphics in a display area of the LCD 116 according to one or more embodiments of the present disclosure.

The control system 112 may include at least one controller 114. The controller 114 may be a processor including a single processing unit or a number of processing units, all of which may include multiple computing units. The explicit use of term "processor" should not be construed to refer exclusively to hardware capable of executing a software application. Rather, according to embodiments of the disclosed subject matter, the controller 114 may be implemented as one or more microprocessors, microcomputers, digital signal processor, central processing units, state machines, logic circuits, and/or any device that may be capable of manipulating signals based on operational instructions. Among the capabilities mentioned herein, the controller 114 may also be configured to receive, transmit, and execute computer-readable instructions. The controller 114 may also enable digital content to be consumed in the form of video for output via the LCD 116 and/or audio for output via the speakers 121. Generally, the controller 114 may be interconnected via a bus 402 to various devices, such as memory 404. In one or more embodiments, the memory 404 may include a Random Access Memory (RAM) and/or a Read Only Memory (ROM). In one or more embodiments, an Input/Output adapter may connect to peripheral devices, such as program storage devices that may be readable by the control system 112. The control system 112 may read the instructions from the program storage devices and follow the instructions to perform operations, methods and/or processes according to one or more embodiments of the disclosed subject matter.

The control system 112 may further include a user interface adapter that may connect the user interface 118 to the bus 402 to gather user inputs from the user interface. The user interface 118 may include, but not limited to, a keyboard, a mouse, a microphone, and/or a touch screen device. Additionally, a communication adapter may connect the bus 402 to a data processing network, and a display adapter may connect the bus 402 to the LCD 116, which may be embodied as an output device.

INDUSTRIAL APPLICABILITY

The present disclosure relates to the LCD 116 having an information layer 208 provided over the dimming mask layer 206, which can be provided over the graphics layer 204, and a method 500 for selectively controlling individual brightness of predetermined portions of the LCD 116. The information layer 208 and the dimming mask layer 206 may be applied over or in front of the graphics layer 204 of the LCD 116. The dimming mask layer 206 may be applied throughout the display area 202 of the LCD 116, that is, cover completely the display area 202 and/or the graphics layer 204. The information layer 208 may selectively and timely display important information, such as one or more warnings or alerts, to the operator of the vehicle 100. Such selective and timely display of information items 210 of the information layer 208 can be based on and in response to detection of one or more operating conditions of the vehicle 100. As a non-limiting example, the operator of the vehicle 100 can set the brightness of the LCD 116 to an acceptable viewing brightness for operating the vehicle 100, while embodiments of the disclosed subject matter can periodically provide more brightly displayed information items on the LCD 116 in an effort to draw operator attention to such information items.

Figure 5:
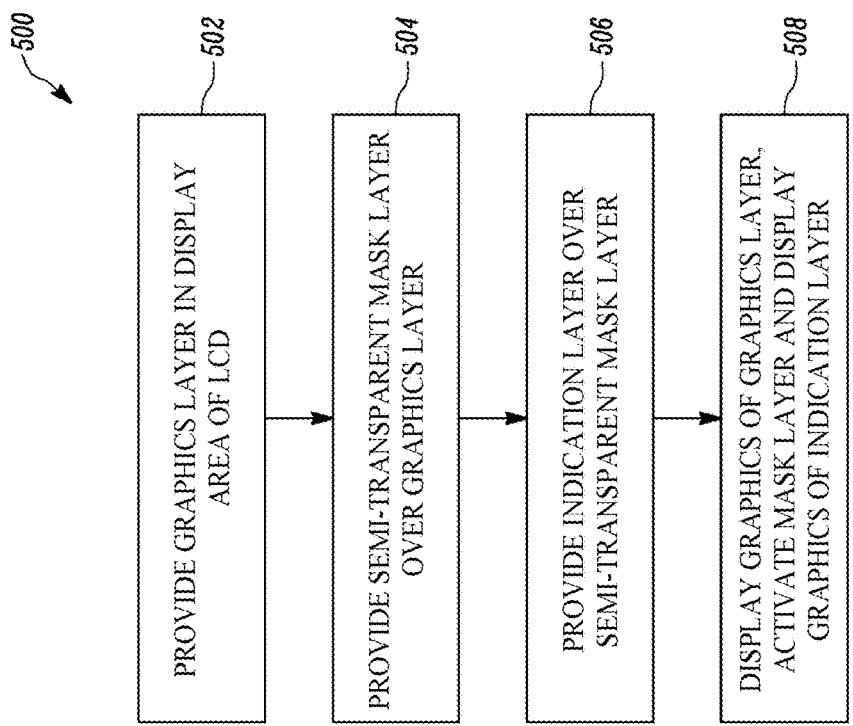
FIG. 5 is a flowchart of a method of selectively controlling individual brightness of select areas of the LCD, according to one or more embodiments of the present disclosure.

FIG. 5 illustrates a flow chart of the method 500 to selectively control individual brightness of select areas of the LCD 116 according to one or more embodiments of the present disclosure. Such selective brightness control can be performed using controller 114, which may be embodied in or as control circuitry.

At block 502, the method 500 may include providing the graphics layer 204 in the display area 202 of the LCD 116. Generally, the controller 114 may control the display of graphics of the graphics layer 204 in the display area 202 of the LCD 116. The graphics may correspond to vehicle-related information, such as static and/or dynamic vehicle operating information. Examples of static vehicle operating information include templates regarding fuel status, engine temperature, vehicle speed, battery charge, and lubricant temperature, for instance. Examples of dynamic vehicle operating information include current status indicators regarding fuel level, engine temperature, vehicle speed, battery charge, and lubricant temperature, for instance. Additional information may be provided by the graphics of the graphics layer 104, such as GPS or map information associated with a current or anticipated position of the vehicle 100.

At block 504, the method 500 may include providing the dimming mask layer 206 over the graphics layer 204. The controller 114 may control a transparency value of the dimming mask layer 206 provided over the graphics layer 204. The controller 114 may control the transparency level of the dimming mask layer 206 to control the brightness of the graphics layer 204. For example, the dimming mask layer 206 may dim a brightness level of the graphics layer 204. Different predetermined amounts of transparency values for the dimming mask layer 206 may be stored in memory 404, and the controller 114 can set (or reset) the transparency value of the dimming mask layer 206 to one of the stored transparency values.

At block 506, the method 500 may include providing the information layer 208 over the dimming mask layer 206. The controller 114 may further display at least one graphical indication or information item 210 of the information layer 208, for instance, in response to detection of an abnormal operation condition of the vehicle 100. The information layer 208 may be controllable independent of the graphics layer 204 and the dimming mask layer 206. Any indications or information items 210 displayed upon activation of the information layer 208 can be brighter than displayed graphics of the graphics layer 204.

As block 508, the method 500 can include displaying graphics of the graphics layer 204, activating the dimming mask layer 206 to present an amount of transparency, for instance, less than 100% transparency, and displaying select graphics of the information layer 208, particularly graphics corresponding to one or more indications or information items 210. The brightness of the graphics of the information layer 208 can be greater than the graphics of the graphics layer 204, even if the brightness level of the graphics of the information layer 208 is lowered. Further, the activation of the dimming mask layer 206 can be responsive to a detected operating condition or characteristic, such as an operating condition or characteristic of the vehicle 100 and/or a detected ambient light amount outside the vehicle 100 or inside the operator cabin 102 of the vehicle 100. Likewise, the display of graphics of the information layer 208 may be based on and responsive to the detected operating condition or characteristic.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vehicle comprising:
   one or more sensors each configured to detect one or more operating conditions of the vehicle;
   a Liquid Crystal Display (LCD) provided in an operator area of the vehicle, the LCD having a display area and configured to selectively display a graphics layer in the display area, a dimming mask layer over the graphics layer, and an alert layer over the dimming mask layer, the alert layer including one or more alerts to alert an operator of the vehicle regarding the one or more operating conditions of the vehicle detected by the one or more sensors; and
   control circuitry in communication with the LCD and the one or more sensors, the control circuitry configured to:
      determine an abnormal operating condition of the vehicle based on data from the one or more sensors corresponding to the one or more operating conditions of the vehicle, and
      activate, simultaneously and responsive to the determined abnormal operating condition of the vehicle, the alert layer to display the one or more alerts, the dimming mask layer, and brightness reduction of the graphics layer,
         the alert layer, the dimming mask layer, and the brightness reduction being simultaneously activated such that a brightness level of the one or more alerts is greater than a brightness level of the graphics layer by at least a predetermined brightness amount,
   wherein the dimming mask layer covers the graphics layer entirely in a front view of the LCD and is free of any cut-out portions that preclude dimming of the dimming mask layer in areas defined by the cut-out portions.

2. The vehicle of claim 1, further comprising input circuitry configured to receive an input to dim the LCD,
   wherein the control circuitry is configured to activate simultaneously the alert layer to display the one or more alerts, the dimming mask layer, and the brightness reduction of the graphics layer responsive to receipt of the input to dim the LCD.

3. The vehicle of claim 1, wherein activation of the alert layer does not cause a change of any graphics of the graphics layer displayed in the display area.

4. The vehicle of claim 1, wherein the control circuitry is configured to:
   determine that the abnormal operating condition of the vehicle is no longer detected, and
   deactivate the alert layer responsive to the determination that the abnormal operating condition of the vehicle is no longer detected.

5. The vehicle of claim 1, wherein the control circuitry is configured to control display of the one or more alerts, the dimming mask, and the graphics layer on the LCD at the same time.

6. The vehicle of claim 1, wherein the dimming mask layer consists of a single dimming layer.

7. The vehicle of claim 1, wherein the control circuitry is configured to adjust a level of transparency of the dimming mask layer after the simultaneous activation of the alert layer, the dimming mask layer, and the brightness reduction of the graphics layer.

8. A control system to selectively control brightness, the control system comprising:
   a Liquid Crystal Display (LCD); and
   a controller, in communication with the LCD, configured to:
      control display of a graphics layer in a display area of the LCD,
      control display of a transparency-controllable mask layer over the graphics layer such that a transparency amount provided by the mask layer covers the display area of the LCD, and
      control display of at least one indication of an information layer over the mask layer,
         the information layer having a plurality of indications,
         the plurality of indications including the displayed at least one indication, and
         the plurality of indications being individually displayable as part of the information layer,
      activate the information layer, the transparency-controllable mask layer, and brightness reduction of the graphics layer when a condition is detected,
      wherein the information layer, the transparency-controllable mask layer, and the brightness reduction of the graphics layer are activated such that a brightness level of any indications of the information layer displayed in the display area of the LCD is greater than a brightness level of any portion of the graphics layer displayed in the display area of the LCD.

9. The control system of claim 8, wherein the controller is configured to control display of the graphics layer, the semi-transparent mask layer, and the information layer with at least one of the plurality of indications responsive to receipt of an input to dim the LCD.

10. The control system of claim 9, wherein the input to dim the LCD is generated based on detection of an abnormal operating condition of a machine having the LCD.

11. The control system of claim 8, wherein the display of the information layer includes display of two or more of the plurality of indications, at least one of the two or more of the plurality of indications being a warning regarding a detected abnormal operating condition of a machine.

12. The control system of claim 8, wherein a total area of any displayed indicator of the information layer is one of from approximately 5% to approximately 25% of the display area of the LCD, from approximately 10% to approximately 25% of the display area of the LCD, from approximately 15% to approximately 25% of the display area of the LCD, and from approximately 20% to approximately 25% of the display area of the LCD.

13. The control system of claim 8, wherein the controller is configured to control transparency of the semi-transparent mask layers at a same time when the information layer displays any of the indications in the display area of the LCD.

14. The control system of claim 8, wherein the semi-transparent mask layer is free of any cut-out portions that preclude changing transparency of the transparency-controllable mask layer in areas defined by the cut-out portions.

15. A method to selectively control brightness of a Liquid Crystal Display (LCD), the method comprising:
- providing a graphics layer in a display area of the LCD;
- providing a semi-transparent mask layer above the graphics layer; and
- providing an indication layer above the semi-transparent mask layer, the indication layer being controllable independent of the graphics layer and the semi-transparent mask layer to selectively display at least one graphical indication; and
- activating the indication layer, the semi-transparent mask layer, and brightness reduction of the graphics layer when a condition is detected,
- the indication layer, the semi-transparent mask layer, and the brightness reduction of the graphics layer being activated such that the at least one graphical indication, when displayed, always has a brightness greater than a brightness of any graphics of the graphics layer displayed when the at least one graphical indication is displayed.

16. The method of claim 15, further comprising:
- displaying graphics of the graphics layer in the display area of the LCD;
- activating only one transparency value of the semi-transparent masking layer; and
- displaying the at least one graphical indication of the indication layer.

17. The method of claim 16, wherein the displaying the graphics of the graphics layer, the activating only the one transparency value of the semi-transparent mask layer, and the displaying the at least one graphical indication are performed responsive to an input to dim the LCD.

18. The method of claim 17, wherein the input to dim the LCD is a control signal generated by control circuitry responsive to detection of an abnormal operating condition of a machine having the LCD.

19. The method of claim 16, further comprising increasing or decreasing a transparency level of the semi-transparent mask layer by a predetermined amount so as to effectively transition to activation of another semi-transparent mask layer and deactivate the prior semi-transparent mask layer.

20. The method of claim 15, wherein the semi-transparent mask layer defines a same area as an area of the graphics layer and is free of any cut-outs that preclude changing transparency of the semi-transparent masking layer in areas defined by the cut-outs to dim corresponding portions of the graphics layer underlying the cut-outs.

* * * * *